United States Patent

[11] 3,549,121

| [72] | Inventor | Jacques H. Mercier |
| | | 1199 Park Ave., New York, N.Y. 10028 |
| [21] | Appl. No. | 734,388 |
| [22] | Filed | June 4, 1968 |
| [45] | Patented | Dec. 22, 1970 |
| [32] | Priority | June 9, 1967 |
| [33] | | France |
| [31] | | No. 109,745 |

[54] VALVE
7 Claims, 8 Drawing Figs.

[52] U.S. Cl. .................................................. 251/149.5,
 251/332
[51] Int. Cl. .................................................... F16l 29/00
[50] Field of Search ........................................... 251/149.5,
 149.6, 332, 351, 149.4, 149.7; 137/583, 322

[56] References Cited
UNITED STATES PATENTS
1,913,274  6/1933  Hayden ........................ 251/351X 2,885,176  5/1959  Bryant ......................... 251/332X FOREIGN PATENTS
520,385  1/1956  Canada ....................... 251/149.5
619,655  1927  France ........................ 251/149.4
517,079  2/1955  Italy ............................ 251/149.5

*Primary Examiner*—M. Cary Nelson
*Assistant Examiner*—R. B. Rothman
*Attorney*—Arthur B. Colvin

ABSTRACT: This invention relates to a valve for fluid under pressure, said valve comprising a fluid passageway having a resilient annular seat encompassing the passageway with a valve member cooperating with said seat to control said passageway, said valve member being urged to closed position against said seat both by the fluid pressure and by associated resilient means, said valve member including a stem, the end of which is designed to be pushed to open the valve.

INVENTOR
JACQUES HENRI MERCIER
BY [signature]
ATTORNEY

INVENTOR
JACQUES HENRI MERCIER

BY 
ATTORNEY

VALVE

As conducive to an understanding of the invention, it is noted that where a pressure vessel may be used in systems in which the pressure varies over a wide ring, it is essential that the charging valve incorporated into the pressure vessel be capable of providing a dependable seal throughout such range of pressures.

It is accordingly among the objects of the invention to provide a pressure valve that is simple in construction and has but few parts that may readily be fabricated at low cost, which may readily be installed, and which will be effective to prevent leakage over a wide pressure range, and which may readily be utilized to effect charging of the pressure vessels without likelihood of damage even upon excessive tightening of the charging fitting connected thereto.

According to the invention, these objects are accomplished by the arrangement and combination of elements hereinafter described and more particularly recited in the claims.

In the accompanying drawings in which are shown one or more of various possible embodiments of the several features of the invention.

Figure 1:
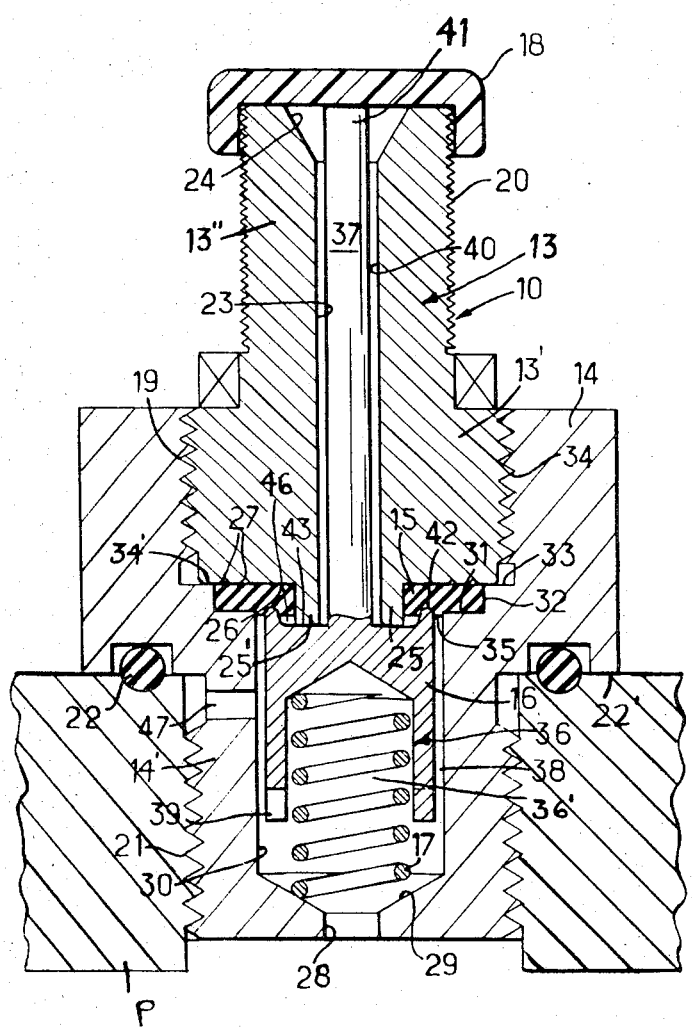
FIG. 1 is a longitudinal sectional view of a valve according to the invention designed to be mounted in a threaded opening of a pressure vessel.

Referring now to the drawings, the valve 10 comprises a base portion 14 having an axial bore therethrough of enlarged diameter at its outer end as at 34. End 34 is internally threaded as at 19 to receive the correspondingly threaded enlarged diameter end portion 13' of a plug 13, the latter having a reduced diameter stem 13" which is externally threaded as at 20.

The plug 13 has an axial bore 23 therethrough with a conical recess 24 at its outer end. The inner end of the axial bore 23 extending through the end portion 13' has a cylindrical boss 25 which projects from the inner face 26 of the end portion 13. The face 26 is flat and has two relatively shallow concentric annular grooves 27. The bore in the base portion 14 is of reduced diameter as at 32 defining an annular shoulder 33 between the reduced portions 32 and the enlarged diameter threaded portion 34. The end portion 13' is threaded into portion 34 so that the periphery 34' of its inner end will abut against said shoulder 33.

The bore of said base portion 14 has an additional reduced diameter portion 30 defining a cavity having an annular shoulder 31 at its outer end and having a conical seating surface 29 at its inner end which tapers inwardly to a smaller diameter port 28 at the inner end of the axial bore in the base portion 14.

As is clearly shown in FIG. 1, the length of the cylindrical boss 25 is greater than the length of the reduced diameter portion 32 of the axial bore in the body portion 14 so that the end 25' of said cylindrical boss extends beyond the annular shoulder 31.

Positioned on shoulder 31 is the outer periphery of a washer 15 of resilient material, said washer defining a resilient seat.

As shown in FIG. 1, the washer encompasses the cylindrical boss 25, the end 25' of which protrudes beyond the washer. The outer periphery of the washer is securely clamped between the flat face 26 of end portion 13' of the plug 13 and the annular shoulder 31, the abutment of the periphery 34' of said face 26 against annular shoulder 33, when the end portion 13' is screwed into the threaded bore 34, preventing undue compression of the washer.

The washer 15 which may be of rubber or similar material, is normally of thickness greater than the length of reduced portion 32, and less than the length of the cylindrical boss 25 so that when the face 26 of end portion 13' abuts against shoulder 33, the washer will be compressed to provide a dependable seal, the material of the washer flowing into the grooves 27 to enhance the seal.

With the washer thus mounted, the portion of the inner surface of the washer extending inwardly of annular shoulder 31 will be substantially coplanar with said shoulder 31, and will present an uncovered annular sealing zone 35 which extends between the cylindrical boss 25 and the cylindrical wall of the reduced diameter portion 32 to define a valve seat.

Positioned in the reduced diameter portion 30 is a cylindrical cup-shaped valve member 36, the outer surface of which is considerably spaced from the wall surface of bore portion 30 as at 38.

The end wall or floor 16 of the cup-shaped valve member has an axial stem 37 extending therefrom through the bore 23 of plug 13. The stem 37 is of much smaller diameter than bore 23 to define a fluid passageway 40 therebetween.

The end of the wall of the cup-shaped valve member 36 has a plurality of notches 39 therethrough defining passageways.

The inner end of the base 14 is of reduced diameter as at 14' and is externally threaded as at 21. The reduced diameter end 14' defines an annular shoulder 22' which has an annular groove therein in which a resilient O-ring 22 is positioned, and a passageway 47 extends through reduced diameter portion 14' adjacent the annular shoulder 22'.

The outer surface 43 of the floor 16 of valve member 36 has a peripheral rim 42 which is normally urged against the sealing portion 35 of washer 15 by means of a coil spring 17, positioned in the recess 36' of the cup-shaped valve member 36 and compressed between opposed surfaces of the valve member and the seating surface 29.

Since the valve member 36 is essentially floating, there is no problem of alignment and an effective seal will be provided so long as the annular rim 42 engages washer 15. The abutment of the outer surface 43 of the floor of the valve member against the end 25' of the cylindrical boss 25 will prevent cutting of the washer 15 by the rim 42.

It is to be noted that the end 41 of the stem 37 extends into the conical recess 24 when the valve member is in closed position as shown in FIG. 1.

It is to be further noted that the clearances 40 and 38 and the port 28 form a passageway for the fluid charged through the inlet 24. This passageway is normally closed as at 46 when the annular rim 42 is urged against the surface 35 of washer 15, by both the force of spring 17 and the fluid pressure in the pressure vessel P being charged as shown in FIG. 1. The passageway is open when the annular rim 42 is moved away from the sealing portion 35 of washer 15 when the stem 37 is moved inwardly in the manner now to be described.

Figure 2:
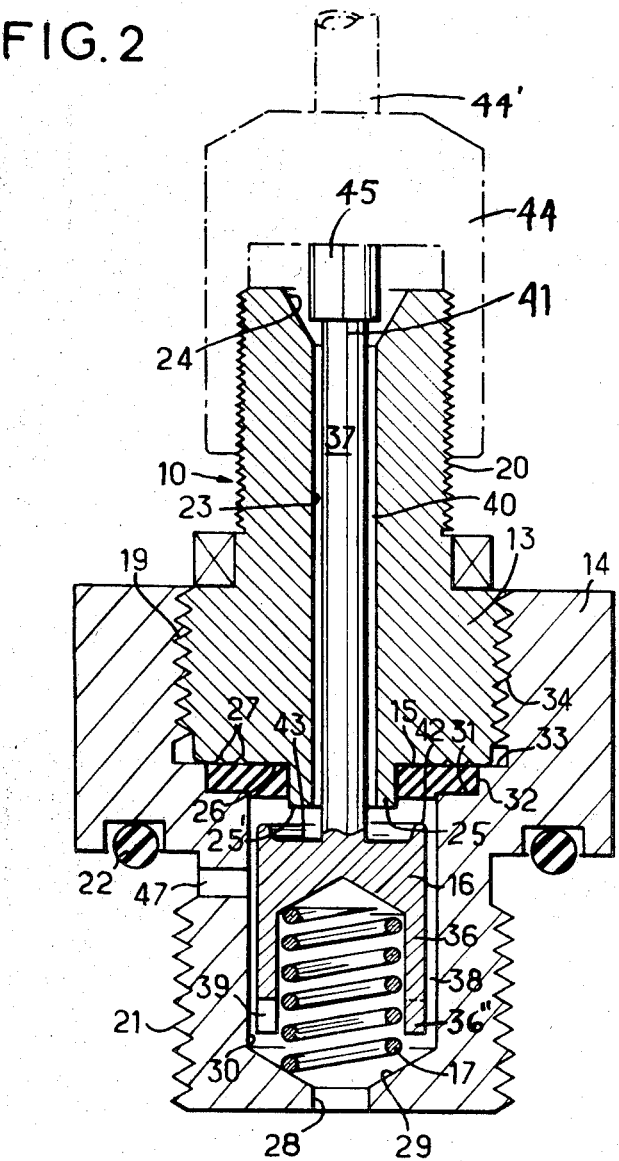
FIG. 2 is a view similar to FIG. 1 but showing the valve in the normal open position.

To effect opening of the valve in order to charge or discharge the pressure vessel as the case may be, a dust cover or cap 18 which may be of plastic, positioned over the end of the stem 13" of the plug 13 is removed and a cup-shaped coupling 44 shown diagrammatically in FIG. 2 is screwed onto the threaded stem 13".

The coupling 44 has an internal axial hub 45 designed to react against the end 41 of the stem 37 to move the latter inwardly. Thus, when the coupling 44 is screwed in place, the stem 37 will be moved inwardly to move the annular rim 42 of the valve member 36 away from its seat 35, to provide communication between port 28 of the base 14 and the conduit 44' connected to the coupling.

Figure 3:
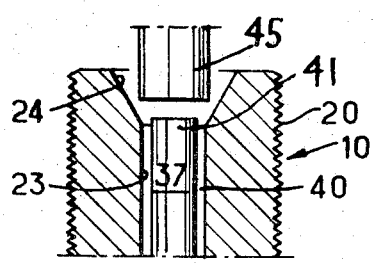
FIG. 3 shows a fragmentary detail position of the valve resulting from excessive charging pressure.

In the event that when the valve member 36 is moved to open position, the sudden rush of fluid under pressure should cause the valve member 36 to move away from its seat rapidly, so that the end 41 of the stem 37 moves away from the hub 45 as shown in FIG. 3, by reason of the fact that the rim 36" of the cup-shaped valve member would abut against the surface 29, excessive compression of coil spring 17 would be prevented to insure long life of said coil spring.

Figure 4:
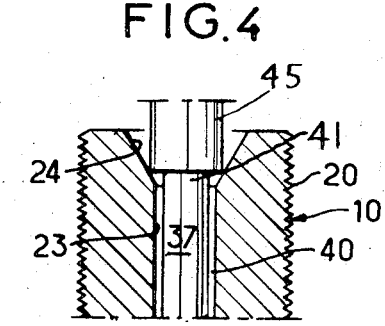
FIG. 4 shows a fragmentary detail position of the valve resulting from excessive tightening of the charging fitting.

The abutment of hub 45 against conical surface 24, as shown in FIG. 4, prevents excessive inward movement of the valve member 36 by reason of the force exerted by the coupling 44 when it is tightened. Thus, when such abutment occurs, the rim 36" of the valve member 36 will be slightly spaced from the seating surface 29 so that no excessive force will be exerted against the valve member 37 or stem 37 which could cause breading thereof.

In the embodiments shown in FIGS. 1 to 4, the valve unit 10 is designed to be screwed into the correspondingly threaded opening in the wall of a pressure vessel P as shown in FIG. 1. The O-ring seal 22 insures that there will be no leakage of fluid under pressure from the pressure vessel.

The port 47 insures that as the valve unit is unscrewed for removal there will be relief of fluid under pressure from the pressure vessel before the valve unit is completely unscrewed to prevent blowout of the latter.

Figure 5:
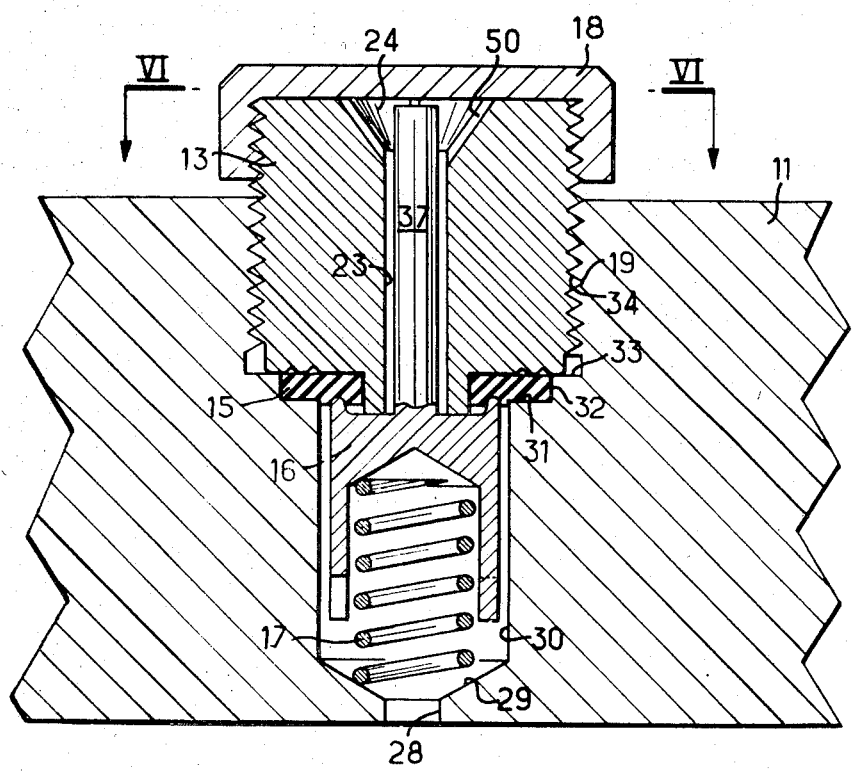
FIG. 5 is a longitudinal sectional view of a valve according to the invention designed to be incorporated in a pressure vessel wall.
Figure 6:
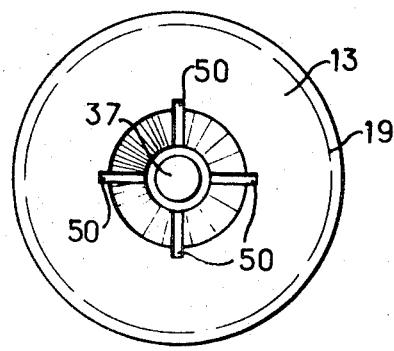
FIG. 6 is a transverse sectional view taken along line VI-VI of FIG. 5.

The embodiment shown in FIGS. 5 and 6 is similar to the embodiment shown in FIGS. 1 to 4 and corresponding parts carry the same reference numerals.

The main difference between the embodiment of FIGS. 5 and 6 and the embodiment of FIGS. 1 to 4 is that the base member 14 of FIGS. 1 to 4 which is a separate and distinct piece is replaced by the wall 11 of the pressure vessel itself.

To this end the wall 11 is drilled to provide the elements 28, 29, 30, 31, 32, 33, 34 of the embodiment of FIGS. 1 to 4. To facilitate the mounting of the plug 13 into the threaded opening 34, the conical shaped opening 24 of bore 23 is provided with a plurality of grooves 50 to receive a driving tool, such as a "Phillips" head screw driver.

Since the operation of the embodiment of FIGS. 5 and 6 is identical to the operation of the embodiment of FIGS. 1 to 4, it will not be described.

Figure 7:
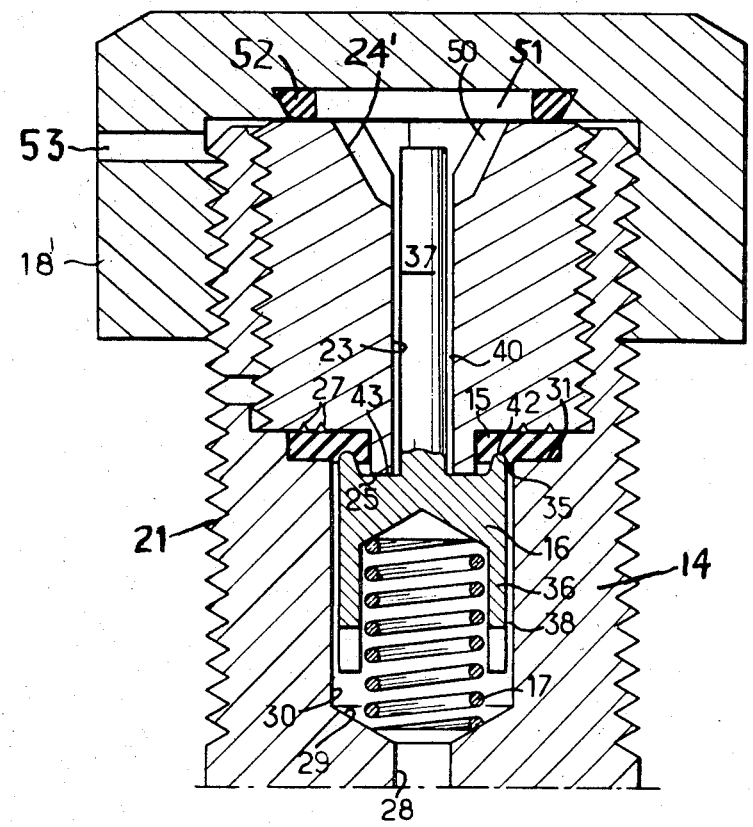
FIGS. 7 and 8 are longitudinal sectional views of two additional embodiments of the invention.

The embodiment of FIG. 7 shows another modification of the invention which is related substantially solely to the configuration of the base member 14 of FIG. 7. Thus, the base member 14 has a body portion that is cylindrical in cross section with peripheral threads 21' which corresponds to the threads 21 in FIG. 1 for example.

The charging port 24' is closed by an encompassing cup-shaped cap 18', internally threaded so that it may be screwed on the base member 14. The cap has a recess 51 in the floor thereof in which a gasket 52 is positioned to provide a seal. The cap has a transverse relief port 53 so that if there should be leakage of fluid under pressure from the pressure vessel into the recess 51, when the cap 18' is rotated for removal, the pressure will be relieved before the cap is completely removed to prevent blowout thereof.

Figure 8:
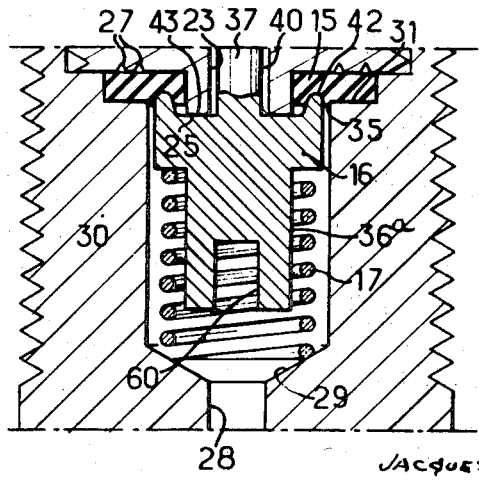
Figure 8:

In the embodiments previously described, the coil spring 17 is positioned in the cavity of the cup-shaped valve member 36. However, as shown in FIG. 8, the valve member 36a could be solid and encompassed by the coil spring with the lower end of the valve member being split at 60 so as not to impede flow of fluid through the port 28.

The valve members above described thus have relatively few parts and may readily be manufactured by simple machining operations and by reason of the fact that the valve may be quickly disassembled, the washer 15 may readily be removed for replacement.

Since the washer 15 is held firmly in position without likelihood of being crushed or cut, and when the valve is in open position, is not in the flow path of the fluid, it will have relatively long life.

Due to the fact that the diameter of bore 30 is greater than the diameter of the bore 23, the velocity of the fluid being charged will be less in the portion 46 of the valve adjacent the washer 15 thereby preventing turbulence at such region with resultant injury to the washer.

The valves according to the invention can withstand relatively high pressures due to the fact that there is a rigid abutment of the surface 43 of the valve member against the end 25' of the cylindrical boss. Furthermore, the valve member will dependably remain in closed position due not only to the action of the coil spring 17, but also to the effect of the fluid under pressure reacting thereagainst.

As many changes could be made in the above articles, and many apparently widely different embodiments of this invention could be made without departing from the scope of the claims, it is intended that all matter contained in the above description or shown in the accompanying drawings shall be interpreted as illustrative and not in a limiting sense.

I claim:

1. A valve controlling flow of fluid under pressure, comprising a base having an axial bore therethrough internally threaded at one end, a plug having an axial bore therethrough, the outer end of said bore defining a substantially conical recess, said recess having a plurality of radiating grooves therein, said plug having an externally threaded portion coacting with the internally threaded bore in said base for releasable mount of said plug, said base bore having reduced diameter portions defining a cavity having a port at one end and an annular shoulder at its other end, said plug having a cylindrical hollow boss coaxial with the plug bore, a resilient washer encompassing said boss and having its outer periphery seated on said shoulder and clamped thereagainst by the adjacent surface of said plug, said boss protruding beyond the surface of said washer, a valve member movable in said cavity and having an axial stem extending outwardly from one end thereof through the bore in said plug, said end having an annular rim coaxial with said stem, resilient means in said cavity urging said valve member in direction to move said rim against said washer to define a seal to close off connection between said plug bore and said cavity, said boss limiting the movement of said valve member.

2. A valve for controlling flow of fluid under pressure, comprising a base having an axial bore therethrough internally threaded at one end, a plug having an axial bore therethrough, said plug having an externally threaded portion coacting with the internally threaded bore in said base for releasable mount of said plug, said base bore having reduced diameter portions defining a cavity having a port at one end and an annular shoulder at its other end, said plug having a cylindrical hollow boss coaxial with the plug bore, a resilient washer encompassing said boss and having its outer periphery seated on said shoulder, an additional annular shoulder in said base bore between said first annular shoulder and the internally threaded portion of said base bore, said washer being normally of thickness greater than the length of the wall portions between said shoulders, whereby when said plug is screwed into the threaded portion of said base bore into abutment with said additional annular shoulder, the peripheral portion of said washer resting on said first annular shoulder will be compressed to form a dependable seal, said boss protruding beyond the surface of said washer, a valve member movable in said cavity and having an axial stem extending outwardly from one end thereof through the bore in said plug, said end having an annular rim coaxial with said stem, resilient means in said cavity urging said valve member in direction to move said rim against said washer to define a seal to close off connection between said plug bore and said cavity, said boss limiting the movement of said valve member.

3. The combination set forth in claim 2 in which the surface of the plug inwardly of the peripheral portion thereof movable against said second annular shoulder has an annular groove into which the compressed periphery of said washer will flow to enhance the scaling action affected thereby.

4. A valve for controlling flow of fluid under pressure, comprising a base having an axial bore therethrough internally threaded at its outer end, a plug having an axial bore therethrough, said plug having an externally threaded portion coacting with the internally threaded bore in said base for releasable mount of said plug, said base being of reduced outer diameter at its inner end defining an annular shoulder, said shoulder having an annular groove, an O-ring in said annular groove, and a relief port extending through said reduced diameter portion into the cavity adjacent said annular shoulder defined by the reduced portion of said base, said base bore having reduced diameter portions defining a cavity having a port at one end and an annular shoulder at its other end, said plug having a cylindrical hollow boss coaxial with the plug bore, a resilient washer encompassing said boss and having its outer periphery seated on said shoulder and clamped thereagainst by the adjacent surface of said plug, said boss protruding beyond the surface of said washer, a valve member movable in said cavity and having an axial stem extending outwardly from one end thereof through the bore in said plug, said end having an annular rim coaxial with said stem, resilient means in said cavity urging said valve member in direction to move said rim against said washer to define a seal to close off connection between said plug bore and said cavity, said boss limiting the movement of said valve member.

5. A valve for controlling flow of fluid under pressure, comprising a base having an axial bore therethrough internally threaded at one end, a plug having an axial bore therethrough, said plug having an externally threaded portion coacting with the internally threaded bore in said base for releasable mount of said plug, said base bore having reduced diameter portions defining a cavity having a port at one end and an annular shoulder at its other end, said plug having a cylindrical hollow boss coaxial with the plug bore, a resilient washer encompassing said boss and having its outer periphery seated on said shoulder, and clamped thereagainst by the adjacent surface of said plug, said boss protruding beyond the surface of said washer, a valve member movable in said cavity and having an axial stem extending outwardly from one end thereof through the bore in said plug, said end having an annular rim coaxial with said stem, resilient means in said cavity urging said valve member in direction to move said rim against said washer to define a seal to close off connection between said plug bore and said cavity, said boss limiting the movement of said valve member, a coupling member adapted releasably to engage the outer periphery of said plug, said coupling member having an integral hub adapted to engage the end of said stem to move the latter inwardly, thereby to move the rim of the valve member away from the washer, said coupling having a passageway therethrough to provide communication between a source of gas under pressure and the bore of said plug.

6. The combination set forth in claim 5 in which the outer periphery of said plug and the inner surface of said coupling member are correspondingly threaded to permit said coupling member to be screwed onto said plug, the outer end of the bore in said plug defines a substantially conical recess, the outer end of the stem being positioned in said recess, said hub being of diameter such as to engage the conical surface of said recess to limit inward movement of said stem.

7. A valve for controlling flow of fluid under pressure, comprising a base having an axial bore therethrough internally threaded at one end, a plug having an axial bore therethrough, said plug having an externally threaded portion coacting with the internally threaded bore in said base for releasable mount of said plug, said base bore having reduced diameter portions defining a cavity having a port at one end and an annular shoulder at its other end, said plug having a cylindrical hollow boss coaxial with the plug bore, the end of said boss defining an annular surface perpendicular to the axis of the plug bore, a resilient washer encompassing said boss and having its outer periphery seated on said shoulder and clamped thereagainst by the adjacent surface of said plug, the annular surface of said boss protruding beyond the surface of said washer, a valve member movable in said cavity and having an axial stem extending outwardly from one end thereof through the bore in said plug, said end having an annular rim coaxial with said stem and defining an annular surface between the root end of said stem and said annular rim lying in a plane substantially perpendicular to the axis of said bore and parallel to the annular surface of said boss, the width of the annular surface defined on the valve member being greater than the width of the annular surface defined at the end of said hollow boss whereby said annular surface of said valve member will abut against the annular surface of said boss for limitation of the movement of said valve member by such abutment, resilient means in said cavity urging said valve member in direction to move said rim against said washer to define a seal to close off connection between said plug bore and said cavity.